(12) United States Patent
Steffen et al.

(10) Patent No.: US 8,040,599 B2
(45) Date of Patent: Oct. 18, 2011

(54) MICROSCOPE SYSTEM

(75) Inventors: Joachim Steffen, Westhausen (DE);
Helge Jess, Oberkochen (DE);
Christoph Hauger, Aalen (DE)

(73) Assignee: Carl Zeiss Surgical GmbH,
Oberkochen (DE)

( * ) Notice: Subject to any disclaimer, the term of this patent is extended or adjusted under 35 U.S.C. 154(b) by 460 days.

(21) Appl. No.: 12/162,601

(22) PCT Filed: Jan. 30, 2007

(86) PCT No.: PCT/EP2007/000792
§ 371 (c)(1),
(2), (4) Date: Jul. 29, 2008

(87) PCT Pub. No.: WO2007/085496
PCT Pub. Date: Aug. 2, 2007

(65) Prior Publication Data
US 2010/0110538 A1    May 6, 2010

(30) Foreign Application Priority Data
Jan. 30, 2006   (DE) .......................... 10 2006 004 232

(51) Int. Cl.
*G02B 21/06* (2006.01)
*G02B 21/00* (2006.01)

(52) U.S. Cl. ........................ 359/388; 359/368; 359/385

(58) Field of Classification Search ........... 359/368–390
See application file for complete search history.

(56) References Cited

U.S. PATENT DOCUMENTS

| | | | |
|---|---|---|---|
| 5,371,624 A | 12/1994 | Nagano et al. | |
| 5,512,490 A * | 4/1996 | Walt et al. | 436/171 |
| 6,094,274 A | 7/2000 | Yokoi | |
| 6,300,639 B1 | 10/2001 | Wiederhoeft | |
| 6,400,501 B2 | 6/2002 | Tsuchiya | |
| 6,809,861 B2 | 10/2004 | Kawasaki et al. | |
| 6,829,051 B2 * | 12/2004 | Abe et al. | 356/417 |

(Continued)

FOREIGN PATENT DOCUMENTS

DE            266024 A1       3/1989

(Continued)

OTHER PUBLICATIONS

2005 Sony Europe Brochure, "B/W Video Camera Module XC-E Series", www.sonybiz.net/vision, pp. 1-4.

*Primary Examiner* — Thong Nguyen
(74) *Attorney, Agent, or Firm* — Knobbe Martens Olson & Bear, LLP (57) ABSTRACT

A microscope system is for sequential observation of different fluorescent dyes that are accumulated in a tissue in an object plane. An illumination system and an observation system have at least two operating states. In one operating state, illumination radiation has a spectrum that includes an excitation band of a first fluorescent dye and is partly free from an excitation band of another fluorescent dye. In one operating state of the observation system, observation radiation guided in the first observation optical path has a spectrum in sections of the first observation optical path, which includes a first fluorescence band of the first fluorescent dye, while in another operating state observation radiation has a spectrum in at least some sections which is partly free from the first fluorescence band. A controller is configured to selectively switch the illumination system and the observation system into the first and second operating states.

38 Claims, 4 Drawing Sheets

U.S. PATENT DOCUMENTS

| | | | |
|---|---|---|---|
| 6,995,901 B2 * | 2/2006 | Heffelfinger | 359/381 |
| 7,009,700 B2 | 3/2006 | Dubois et al. | |
| 7,067,825 B2 | 6/2006 | Graefenhain | |
| 7,362,449 B2 | 4/2008 | Dubois et al. | |
| 7,379,238 B2 | 5/2008 | Ganser et al. | |
| 2003/0058530 A1 | 3/2003 | Kawano | |
| 2004/0109231 A1 | 6/2004 | Haisch et al. | |
| 2008/0043324 A1 | 2/2008 | Lytle et al. | |

FOREIGN PATENT DOCUMENTS

| | | |
|---|---|---|
| DE | 19829944 A1 | 1/2000 |
| DE | 10059184 A1 | 8/2001 |
| DE | 10339784 A1 | 3/2004 |
| DE | 10249526 A1 | 5/2004 |
| DE | 10257521 A1 | 7/2004 |
| EP | 0339582 A2 | 11/1989 |
| WO | WO 02/41064 A1 | 5/2002 |

* cited by examiner

MICROSCOPE SYSTEM

BACKGROUND

1. Field

The disclosed technology relates to a microscope system. More precisely, the disclosed technology relates to a microscope system which is configured for a sequential observation of an observed object by using different fluorescent dyes. The microscope system can be a stereoscopic microscope such as a surgical microscope, for example.

2. Description of the Related Art

Fluorescent dyes radiating electromagnetic fluorescence radiation in response to an illumination with electromagnetic excitation radiation of a first wavelength range (in the following referred to as excitation band), said fluorescence radiation being of a second wavelength range (in the following referred to as fluorescence band) different from the first wavelength range (and thus the excitation band), are used in the medical field for various purposes. Examples are the visualization of specific types of tissues, tissue structures, tissue functions etc. For this purpose, a fluorescent dye or a precursor of such a fluorescent dye is administered to a patient to be examined. The fluorescent dye accumulates in specific types of tissues or tissue structures, respectively, of the patient, and, by observing the fluorescence radiation, these tissues or tissue structures but also the process of accumulation can be visualized and localized by an observer. To this end, special optical auxiliary means (such as, for example, infrared or UV cameras and optical amplifiers) are used, since the fluorescence radiation might be very weak and/or outside the visible spectrum (approx. 380-780 nm).

An example for a suitable fluorescent dye is Indocyanine Green (ICG). The excitation band of fluorescence of this fluorescent dye ranges from 400 nm to 780 nm and the fluorescence band lies at approx. 830 nm (and thus lies outside of the visible range in the near-infrared). In order to microscopically examine an ICG-loaded tissue by means of a microscope system, an illumination bandpass filter is arranged in an illumination optical path in front of a light source (such as a laser light source or a xenon lamp or a halogen lamp), the filter characteristic of said illumination bandpass filter is selected such that illumination radiation of the excitation band for ICG (400 nm to 780 nm) is allowed to pass to the tissue. The tissue is imaged by a microscope optics via a first observation optical path to an infrared camera (IR camera), wherein in the first observation optical path an observation bandpass filter is arranged in front of the IR camera to allow electromagnetic radiation of the fluorescence band of ICG (approx. 830 nm) to pass through, but not to allow the observation radiation to pass through. Image data generated by the IR camera can be displayed in the visible range via a monitor by applying electronic image processing techniques, such that the first observation optical path allows an observation of the fluorescence radiation. At the same time, the tissue is imaged by the microscope optics via a second observation optical path without an observation filter to an observation camera (for example a 3-chip CCD camera) and/or an ocular, wherein an infrared barrier filter (IR barrier filter) which does not transmit wavelengths above approx. 700 nm is provided in front of the observation camera to avoid color aberrations caused by the infrared portion of the fluorescence radiation. Consequently, the second observation optical path allows the tissue to be observed under illumination radiation. In this respect, it is known to electronically superimpose and equivalently display the image data generated by the IR camera and the observation camera of the first and second observation optical paths, respectively.

A corresponding structure is known, for example, from German patent application DE 103 39 784 A1 laid open for public inspection, the full content of which is incorporated herein by reference.

The above-described simultaneous observation of the object under examination by using illumination radiation and of the fluorescence radiation facilitates an orientation with respect to the object under examination. This is important, for example, during surgery.

Further, use of Protoporphyrin IX as fluorescent dye is known. The excitation band of the fluorescence of this fluorescent dye is at approx. 400 nm and the fluorescence band ranges between approx. 630 and 730 nm. Accordingly, in a microscope system an illumination filter composed of two bandpass filters is used for illumination which only transmits illumination radiation in the wavelength band from 400 to 430 nm to tissue loaded with Protoporphyrin IX. An observation filter is arranged in a first observation optical path which transmits the fluorescence radiation, but not the illumination radiation. Since the fluorescence band is mainly in the visible range and overlaps only partly with the near-infrared range, observation can be performed by using a conventional observation camera. In case a conventional observation camera is used for observation, no IR barrier filter should be arranged in front of the observation camera, as otherwise a part of the fluorescence radiation would not reach the camera.

Further fluorescent dyes are known to the skilled person and/or are easily found by the skilled person. Moreover, for the examination of living organisms a good agreeableness and biodegradability of the fluorescent dye in the observed organism is desirable in addition to a maximum intensity of the fluorescence radiation and a sufficient distance between the respective excitation band and the fluorescence band.

It follows from the above examples that each fluorescent dye requires the microscope system employed to be adapted to the excitation band and fluorescence band. This is especially evident when use is made of the IR barrier filter in front of the observation camera, which IR barrier filter must be provided in front of the observation camera when ICG is applied as fluorescent dye, but must not be provided when Protoporphyrin IX is applied as fluorescent dye.

Due to the large and to some extent varying number of filters necessary for a fluorescence observation, the refitting of a microscope system for the observation of different fluorescent dyes is very elaborate. This results in that, e.g., during surgery only one fluorescent dye is used, because a time-consuming refitting of the microscope system during surgery is not tolerable. Moreover, such a refitting of the microscope system is frequently not possible either for reasons of hygiene.

Furthermore, there is a risk that filters for different fluorescent dyes are accidentally mixed up during the refitting procedure, and thus the adjustment between the individual filters gets lost. If a different number of filters is used for different fluorescent dyes, there is an additional risk that filters erroneously remain in the microscope system or are not inserted when refitting the microscope system for the fluorescent dyes by changing the filters.

There is a high risk that the use of filters that are not adjusted to a fluorescent dye applied remains unnoticed, since the absence of fluorescence radiation may also be caused by the absence of accumulation of the fluorescent dye in the object under examination (i.e., due to the absence of tumor tissue, etc.). With surgical microscopes, such a mistake may have severe consequences for the health of a patient, because tumor tissue may then remain in the body and a further surgery may become necessary. Furthermore, when trying to make fluorescence radiation nevertheless visible, there is a risk that an unnecessarily large amount of fluorescent dye is administered to a patient, which may cause allergic reactions.

In light of the above, it is the object of the present invention to provide a microscope and in particular a surgical microscope which allows sequential observation of fluorescence radiation of different fluorescent dyes in an object plane in an especially easy and reliable way.

SUMMARY

The above object is solved by a microscope system for observation of fluorescence radiation of different flourorescent dyes in an object plane. According to one aspect, the microscope system includes an illumination system for illuminating the object plane with illumination radiation and an observation system for providing a first observation optical path for optically imaging the object plane. The illumination system has a first operating state in which the illumination radiation has a spectrum which includes a first excitation band of a first fluorescent dye and, at the same time, is partly free from a second excitation band of a second fluorescent dye different from the first fluorescent dye. The observation system has a first operating state in which observation radiation guided in the first observation optical path has a spectrum in sections of the first observation optical path which includes a fluorescence band of the first fluorescent dye. The illumination system has at least a second operating state in which the illumination radiation has a spectrum which includes the second excitation band of the second fluorescent dye. The observation system includes an infrared barrier filter supported by an infrared filter carrier. The observation radiation guided by the first observation optical path can be supplied to the camera via the infrared barrier filter. The observation system has at least a second operating state, in which observation radiation guided in the first observation optical path has a spectrum in sections of the first observation optical path which is partly free from the first fluorescence band of the first fluorescent dye. The microscope system further includes a controller. The controller is configured to selectively switch the illumination system as well as the observation system and the infrared filter carrier into the first operating state or to selectively switch the illumination system as well as the observation system and the infrared filter carrier into the second operating state.

According to a preferred embodiment, an illumination system of the microscope system for illuminating an object plane with illumination radiation has at least two different operating states, wherein in one of these two operating states the illumination radiation has a spectrum which includes a first excitation band of a first fluorescent dye and, at the same time, is partly free from an excitation band of another fluorescent dye, and in at least another one of these operating states the illumination radiation has a spectrum which includes the excitation band of the other fluorescent dye. Further, an observation system of the microscope system for providing a first observation optical path for optically imaging the object plane has at least two different operating states, wherein in one of the at least two operating states observation radiation guided in the first observation optical path has a spectrum at least in sections of the first observation optical path which includes a first fluorescence band of the first fluorescent dye, and wherein in at least one other operating state observation radiation guided in the first observation optical path has a spectrum at least in sections of the first optical path which is partly free from the first fluorescence band of the first fluorescent dye.

In the present application, a spectrum which is partly free from a band is understood to the effect that, after standardization of both spectrum and band, less than 40% and preferably less than 20% and especially preferably less than 10% of the range of the band is overlapped by the spectrum.

Furthermore, it is apparent for the skilled person that the illumination system and the observation system each may have more than two and also a different number of operating states, and that the observation system may also have more than only one observation optical path.

Further, the microscope system has a controller which is configured to selectively switch the illumination system as well as the observation system into the first operating state or to selectively switch the illumination system as well as the observation system into the second operating state.

Thus, the controller causes a (e.g., mechanic and/or electric) coupling of the operating states of the illumination system and the observation system. For example, switching of the operating states can be initiated either by the controller or it can be performed as soon as the controller detects a change of an operating state of the illumination system and/or the observation system. Further, according to an embodiment, switching of the operating states of the illumination system and the observation system can substantially be performed simultaneously, i.e., within a interval of less than 10 seconds and preferably less than 1 second.

As both the illumination system and the observation system each have at least two operating states that are each adapted to different fluorescent dyes, and as the controller automatically switches the operating states of the illumination system and the observation system such that the operating states are each adapted to the fluorescent dye to be observed, the microscope system can be switched particularly fast, easily and reliably between observation of different fluorescent dyes. This allows observation of different fluorescences by using the microscope system even under difficult conditions, such as during surgery. Furthermore, by provision of the controller, an incorrect observation due to a lack of adaptation of the illumination system and the observation system can be avoided in a particularly easy and effective way.

According to an embodiment, an infrared barrier filter supported by an infrared filter carrier is arranged in the first observation optical path, which infrared filter carrier has a first operating state in which the infrared barrier filter is arranged in the first observation optical path, and a second operating state in which the first observation optical path is free from the infrared barrier filter. In this respect, an infrared barrier filter is understood to be a filter that is opaque for near-infrared radiation having a wavelength larger than 700 nm. The controller is configured to selectively switch the illumination system as well as the observation system and the infrared filter carrier into the first operating state or to selectively switch the illumination system as well as the observation system and the infrared filter carrier into the second operating state. As a result, the controller automatically guarantees that the operating state of the infrared filter carrier also corresponds to the respective examined fluorescent dye.

According to a further embodiment, in at least one operating state of the illumination system an illumination filter supported by an illumination filter carrier is arranged in an illumination optical path provided by the illumination system, which illumination filter is transparent for the excitation band of a fluorescent dye to be observed and, at the same time, is substantially opaque for the excitation band of another fluorescent dye.

In this application, a filter that is substantially transparent for a band is understood to be a filter which is transparent for radiation in a wavelength range including at least 50% and preferably at least 70% and further preferably at least 90% of the width of the band by more than 50% and preferably more than 70% and further preferably more than 90% (based on intensity of radiation). Correspondingly, a filter which is substantially/partly opaque for a band is understood to be a filter which is transparent for radiation of a wavelength range that includes at most 40%, and preferably at most 20% and further preferably at most 10% of the width of the band by more than 50% (based on intensity of the radiation).

Additionally or alternatively, in at least one operating state of the observation system an observation filter supported by a first observation filter carrier is arranged in the observation optical path provided by the observation system, which observation filter is transparent for the fluorescence band of an observed fluorescent dye and, at the same time, is substantially opaque for the fluorescence band of another fluorescent dye.

According to a further embodiment, the observation system may comprise a second observation optical path for optically imaging the object plane, wherein a second observation filter carrier is arranged in the second observation optical path, which second observation filter carrier supports a second observation filter and can be switched between at least a first and a second operating state, and wherein the controller is configured to selectively switch the illumination system as well as the second observation filter carrier into the first operating state or to selectively switch the illumination system as well as the second observation filter carrier into the second operating state. Consequently, according to this embodiment, the microscope system can be configured as stereoscopic microscope. The spectrums of observation radiation guided in the first and the second observation optical path may selectively be equal to, or different from one another.

According to an embodiment, at least one filter carrier is switchable between a first operating state in which a first filter supported by the filter carrier is arranged in the respective optical path, and at least a second operating state in which the first filter supported by the filter carrier is arranged outside the respective optical path.

Here, at least one filter carrier may comprise a support element which is mounted to be rotatable about an axis of rotation and may be provided with a drive for rotating the support element, and the at least one filter supported by the filter carrier may be arranged on the support element spaced apart from the axis of rotation. Thus, the filter carrier may be configured as a filter wheel.

Alternatively or additionally, at least one filter carrier may comprise a linearly movable support element and may be provided with a drive for moving the support element, and the at least one filter may be arranged on the support element. Thus, the filter carrier can be configured as a slide filter.

Alternatively or additionally, at least one filter carrier may support a filter, which filter has a first filter characteristic in a first operating state of the filter carrier, and which filter has a second filter characteristic in a second operating state of the filter carrier, which second filter characteristic is different from the first filter characteristic. Thus, the filter carrier is capable of supporting a switchable filter (such as an electronically switchable LC filter, for example).

Additionally or alternatively, at least one filter carrier may have a first operating state in which a filter supported by the filter carrier encloses a first angle of inclination with a core beam of the respective optical path (i.e., a beam of highest intensity of the optical path), as well as a second operating state in which the filter encloses a second angle of inclination, different from the first angle of inclination, with the core beam, wherein the filter has at least two different filter characteristics for beams guided in the respective optical path for the at least two different angles of inclination, and wherein a drive for tilting the filter is provided.

In the context of the present application, filter characteristics are considered as being different, if at least one rising or declining filter slope of the respective filters (with respect to respective wavelengths at which 50% of the radiation is transmitted) is displaced by at least 20 nm and preferably at least 60 nm and further preferably by at least 180 nm.

According to an embodiment, the illumination filter carrier supports at least two illumination filters having different filter characteristics, and the first and/or second observation filter carrier supports at least two observation filters having different filter characteristics. According to an embodiment, a respective filter characteristic each includes the excitation band and fluorescence band, respectively, of an observed fluorescent dye and, at the same time, partly excludes the excitation band and fluorescence band, respectively, of another fluorescent dye.

The at least one illumination filter and/or the at least one observation filter and/or the infrared barrier filter may each be a transmission filter or a reflective filter, for example. Volume-reflective holograms or wavelength-dependent beam splitters may also be used as filters, for example.

According to a further embodiment, the microscope system further comprises an excitation radiation source for illuminating the object plane with excitation radiation, wherein the bandwidth of a spectrum of the excitation radiation is smaller than 300 nm and preferably smaller than 200 nm and substantially includes the excitation band of a fluorescent dye to be observed, and wherein the excitation radiation source has a first operating state in which excitation radiation is emitted, and a second operating state in which no excitation radiation is emitted, and wherein the controller is configured to selectively switch the excitation radiation source as well as the observation system into the first operating state or to selectively switch the excitation radiation source as well as the observation system into the second operating state. Consequently, an adaptation of the operating state of the illumination system can be performed by switching the excitation radiation source on or off. Alternatively, the excitation radiation source may also be provided in addition to the illumination system or replace the same. A spectrum which substantially includes a band is understood here to the effect that, after standardization of both the spectrum and the band, more than 50%, and preferably more than 70% and further preferably more than 90% of an area of the band is overlapped by the spectrum.

According to a further embodiment, the observation system further comprises a first camera arranged in the first observation optical path for generating image data and a calibration device, which calibration device receives image data generated by the camera and has a first operating state in which it color-calibrates the image data, and a second operating state in which it maintains the image data unchanged, the controller being configured to selectively switch the illumination system as well as the observation system and the calibration device into the first operating state or to selectively switch the illumination system as well as the observation system and the calibration device into the second operating state. Consequently, a color aberration contained in the image data can be corrected electronically.

According to a further embodiment, the microscope system further comprises a communication interface connected to the controller, which communication interface allows to input a respective desired fluorescent dye, said controller controlling the operating states of the filter carrier and/or the excitation radiation source and/or the calibration device in response to a respective fluorescent dye identified by the communication interface according to a predetermined dependence. This predetermined dependence can be stored in a database of the controller, for example.

In the following, a preferred embodiment of the invention is explained in further detail with reference to the Figures, wherein.

BRIEF DESCRIPTION OF THE DRAWINGS

DETAILED DESCRIPTION OF CERTAIN EMBODIMENTS

Figure 1:
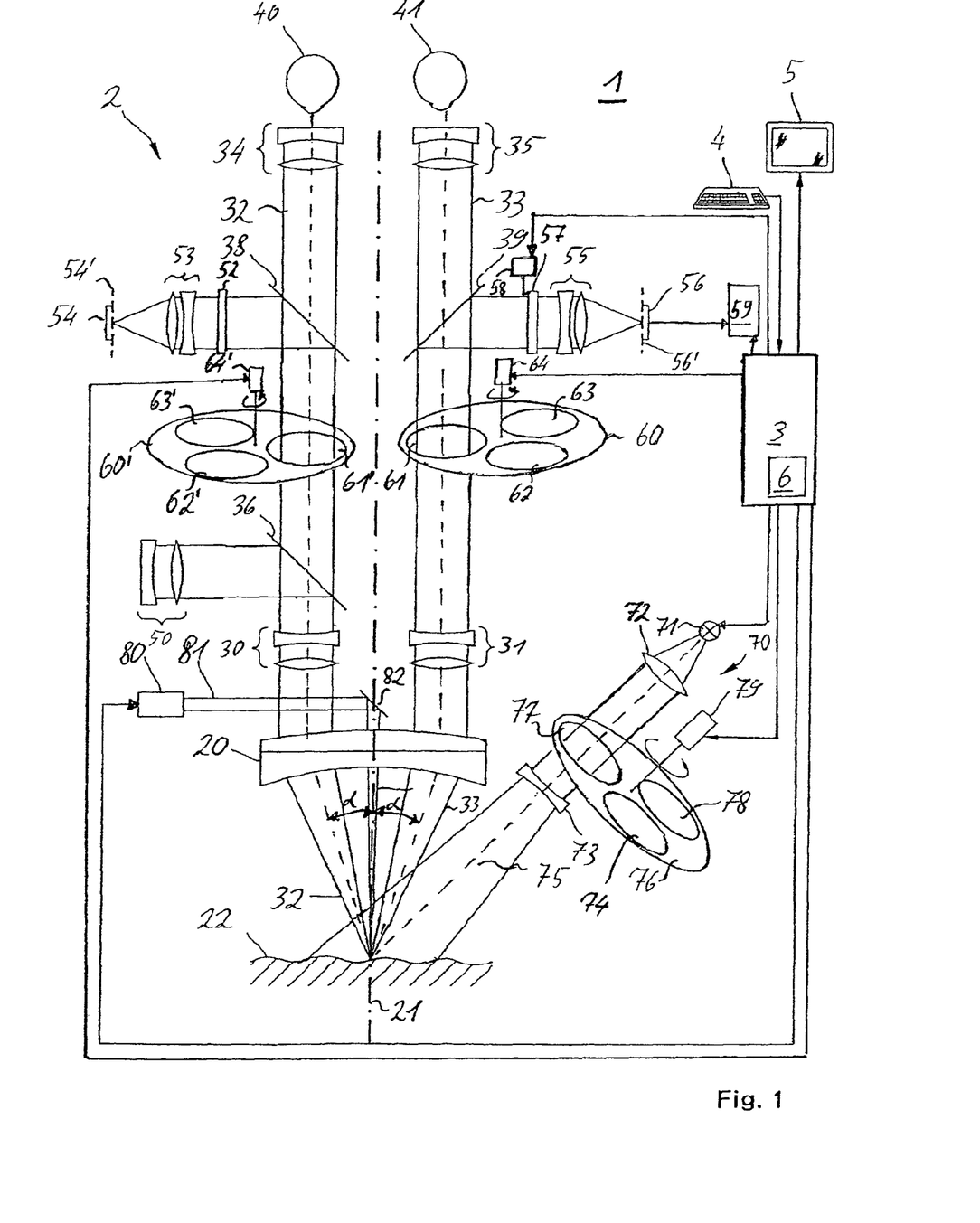
FIG. 1 shows a schematical representation of optical paths in a microscope system according to an embodiment of the present invention.

A microscope system 1 schematically illustrated in FIG. 1 comprises a microscope optics 2 having an objective 20 with an optical axis (main axis) 21. An object 22 to be examined is arranged in an object plane of the objective 20. Light originating from the object 22 is conveyed into a parallel beam bundle by the objective 20, with two zoom systems 30, 31 being arranged spaced apart from the optical axis 21 in the parallel beam bundle, which zoom systems each pick sub-beam bundles from the parallel beam bundle and thus define first and second observation optical paths 33 and 32. The sub-beam bundles of the first and second observation optical paths 33 and 32 are guided via deflecting prisms that are not shown in FIG. 1 to oculars 34, 35 into which an observer looks with his left eye 40 and right eye 41, respectively, to perceive a magnified representation of the object 22 as image. In this respect, the image perceived by the left eye 40 corresponds to an image when observing the object at an angle α with respect to the optical axis, and the image perceived by the right eye 41 corresponds to an image when observing the object 22 at an angle −α with respect to the optical axis 21. Consequently, the observer perceives with both eyes 40, 41 a stereoscopic image of the object 22.

A semi-reflective mirror 36 is arranged in the second observation optical path 32 for coupling out a portion of the light as a beam. The beam thus coupled out is guided to an ocular 50 through which a second observer can perceive a magnified representation of the object 22 as image. Alternatively, the beam can also be guided to a camera etc.

A first and a second observation filter carrier 60, 60' are arranged in the first and second observation optical paths 33, 32, respectively, for optically imaging the object 22 of the microscope system 1 shown in the FIG. 1. In FIG. 1, the first and second observation filter carriers 60, 60' are each aluminum disks that are pivot-mounted, each of which supports two different transmission filters 61, 62 and 61', 62', respectively, as well as one opening 63 and 63', respectively. The observation filter carriers 60, 60' alternatively can be made from rigid plastic or from another suitable material instead of aluminum.

The transmission filters 61 and 61' are identical with respect to their respective filter characteristic (transmission characteristic), and the transmission filters 62 and 62' are different with respect to their respective filter characteristic. In the illustrated embodiment, the filters 61 and 61' have filter characteristic 61c shown in continuous line in FIG. 3A, the filter 62 has filter characteristic 62c shown in continuous line in FIG. 3B, and the filter 62' has filter characteristic 62c' shown in continuous line in FIG. 3B. The filter characteristic 61c of filters 61, 61' has a threshold (slope) at around 620 nm, below which the filters 61, 61' are substantially not transparent, and above which the filters 61, 61' are substantially transparent. The filter characteristics 62c and 62c' of the filters 62, 62', respectively, have a threshold at approx. 700 nm or 900 nm, respectively, below which the filters 62, 62' are substantially transparent and above which the filters 62, 62' are substantially not transparent.

Figure 3A:
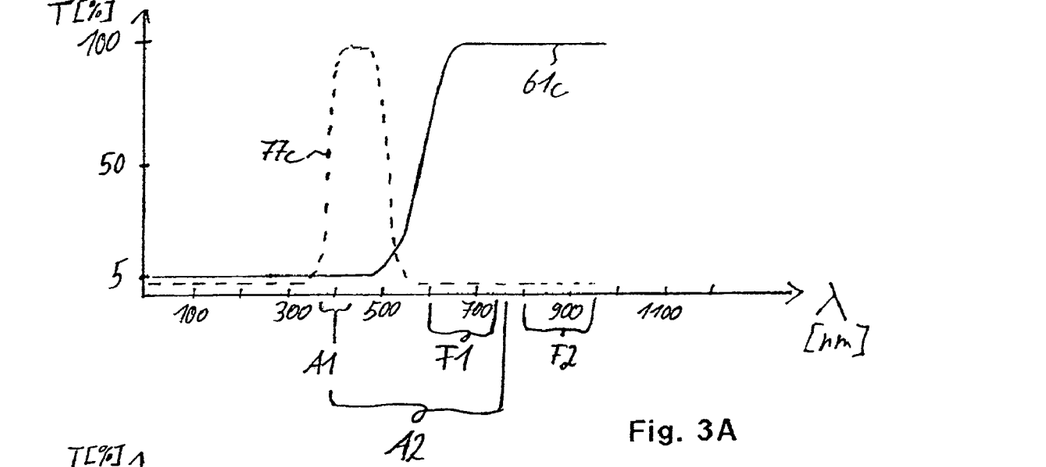
FIG. 3A 3B and 3C show transmission characteristics of filters that are supported by the filter carriers according to FIGS. 2A, 2B and 2C.
Figure 3B:
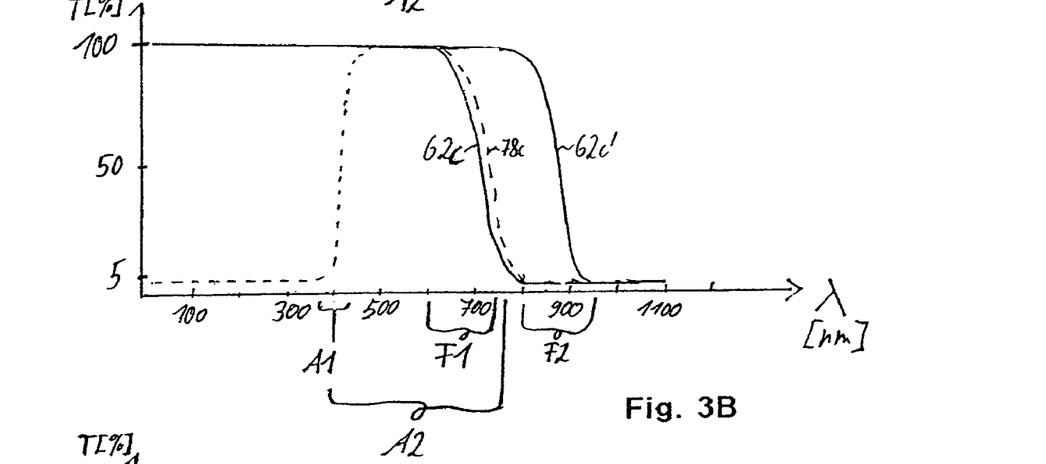
Figure 3C:
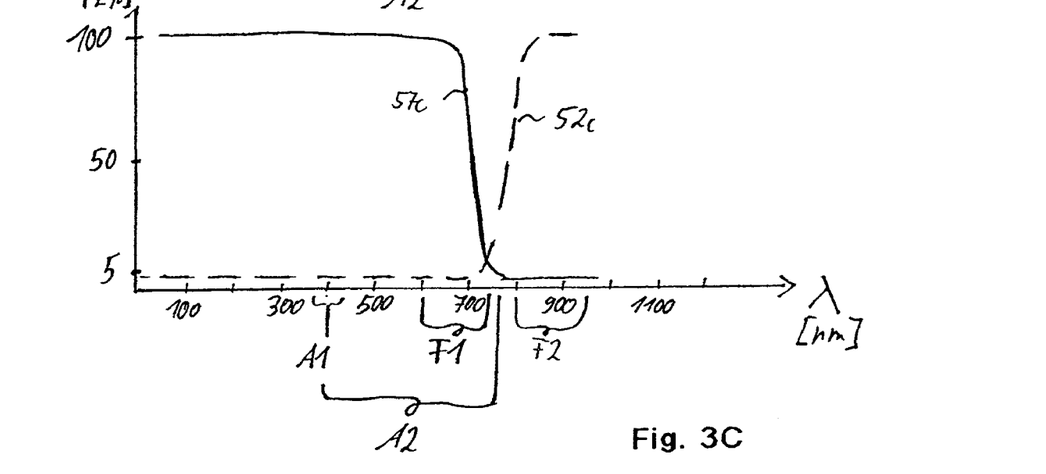

Further, the fluorescence band F1 and the excitation band A1 of the fluorescent dye Protoporphyrin IX as well as the fluorescence band F2 and the excitation band A2 of the fluorescent dye ICG (Indocyanine Green) are shown in FIGS. 3A, 3B and 3C.

The first and second observation filter carriers 60, 60' are selectively switchable into a first operating state in which the filters 61, 61' are each arranged in the first respective second observation optical path 33, 32, into a second operating state in which the filters 62, 62' are each arranged in the first respective second observation optical path 33, 32, and into a third operating state in which the openings 63, 63' are each arranged in the first or second observation optical paths 33, 32, respectively, by using two drives 64 and 64', each being connected to a controller 3 and being controlled by the same. Consequently, the controller 3 selectively controls the first and second observation filter carriers 60, 60' by using the drives 64 and 64' such that a filter having the same or a different filter characteristic as in the second observation optical path 32 is arranged in the first observation optical path 33.

For example, in case of excitation of ICG introduced into the object 22, the filter 62 can be arranged in the first observation optical path 33 for the observation of the object 22 by using excitation radiation (normally white light), while, at the same time, a blocking of near-infrared radiation is enabled. Due to the blocking of near-infrared radiation above 700 nm, the spectrum in the first observation optical path 33 in the section behind the filter 62 is partly free from the fluorescence band of Protoporphyrin IX. A spectrum which is partly free from a band is understood in this context to the effect that, after a standardization of both the spectrum and the band, less than 40% and preferably less than 20% and further preferably less than 10% of the area of the band are overlapped by the spectrum. At the same time, the opening 63 can be arranged in the second observation optical path 32, for example, for a simultaneous observation of the object 22 under excitation radiation and the fluorescence of the fluorescent dye ICG introduced into the object 22.

Figure 2A:
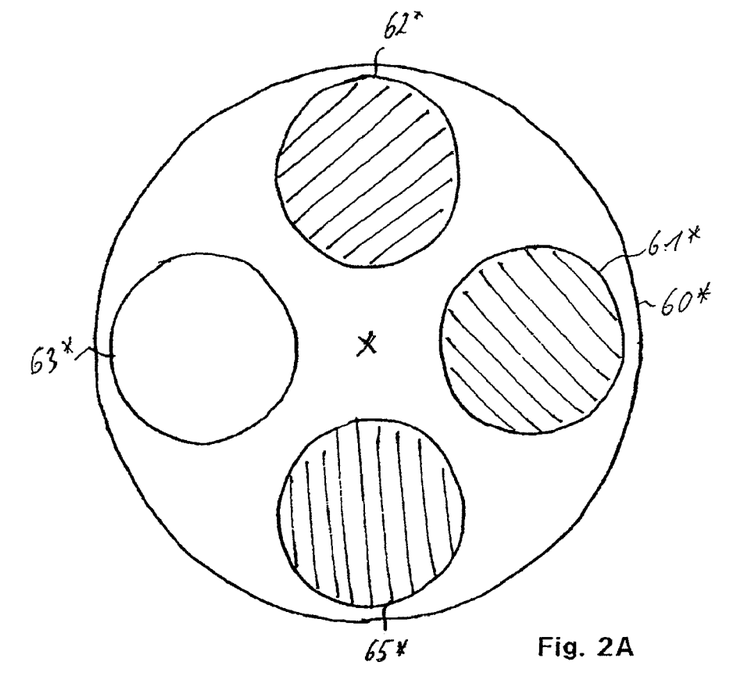
FIG. 2A 2B and 2C show schematical representations of different embodiments of filter carriers which can be used in the microscope system according to FIG. 1.

The present invention is not restricted to the above observation filter carrier and observation filters. Rather, the observation filter carriers can each support any number of filters with different filter characteristics. FIG. 2A schematically shows a top view on an observation filter carrier 60* which can be alternatively used and which has three observation filters 61*, 62*, 65* having different filter characteristics as well as an opening 63*. In the present application, filter characteristics are considered as being different if at least one rising or declining filter slope of the respective filter (with respect the respective wavelength at which exactly 50% of the radiation is transmitted) is displaced by at least 20 nm and preferably by at least 60 nm and further preferably by at least 180 nm.

A further semi-reflective mirror 39 couples a further beam out of the first observation optical path 33, which is conveyed by a camera adapter optics 55 to a light-sensitive area 56' of a CCD camera 56 in such a way that the same is capable of taking images of the object 22 during observation at an angle $-\alpha$ to the optical axis 21. The CCD camera 56 does not have a fixedly incorporated infrared barrier filter.

Figure 2B:
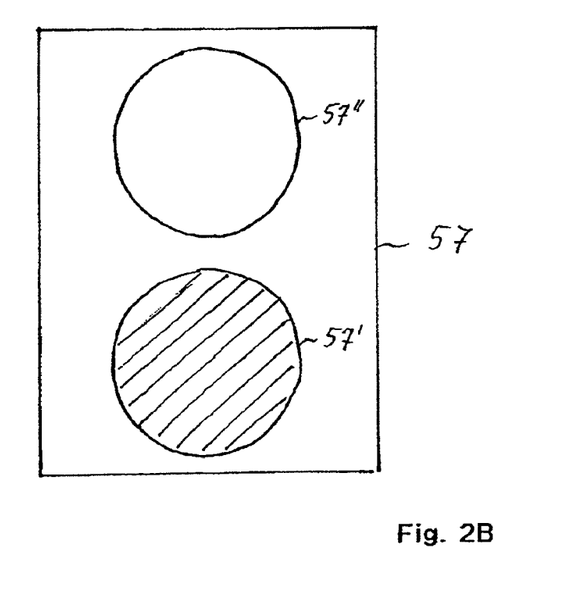

Rather, an infrared filter carrier 57 is arranged in the beam between the semi-reflective mirror 39 and the camera optics 55, the top view of which is schematically shown in FIG. 2B. In the embodiment shown in FIG. 2B, the infrared filter carrier 57 has a metal carrier which metal carrier supports an infrared barrier filter 57' and which metal carrier can be linearly displaced perpendicularly to the beam between two operating states by means of a drive 58. Furthermore, the metal carrier has an opening 57''. The infrared barrier filter 57' is a reflective filter that is substantially opaque for near-infrared radiation having a wavelength larger than 700 nm and has the filter characteristic 57c which is schematically shown in FIG. 3C.

In a first operating state of the infrared filter carrier 57 the infrared barrier filter 57' is arranged in the beam between the semi-reflective mirror 39 and the camera optics 55, and in a second operating state the opening 57'' is arranged in the beam which is thus free from the infrared barrier filter 57'. Accordingly, in the first operating state the spectrum in the first observation optical path 33 in a section between the infrared barrier filter 57' and the CCD camera 56 is partly free from the fluorescence band of Protoporphyrin IX.

The drive 58 is connected to the controller 3 which controls a respective operating state of the infrared filter carrier 57 by using the drive 58.

Figure 2C:
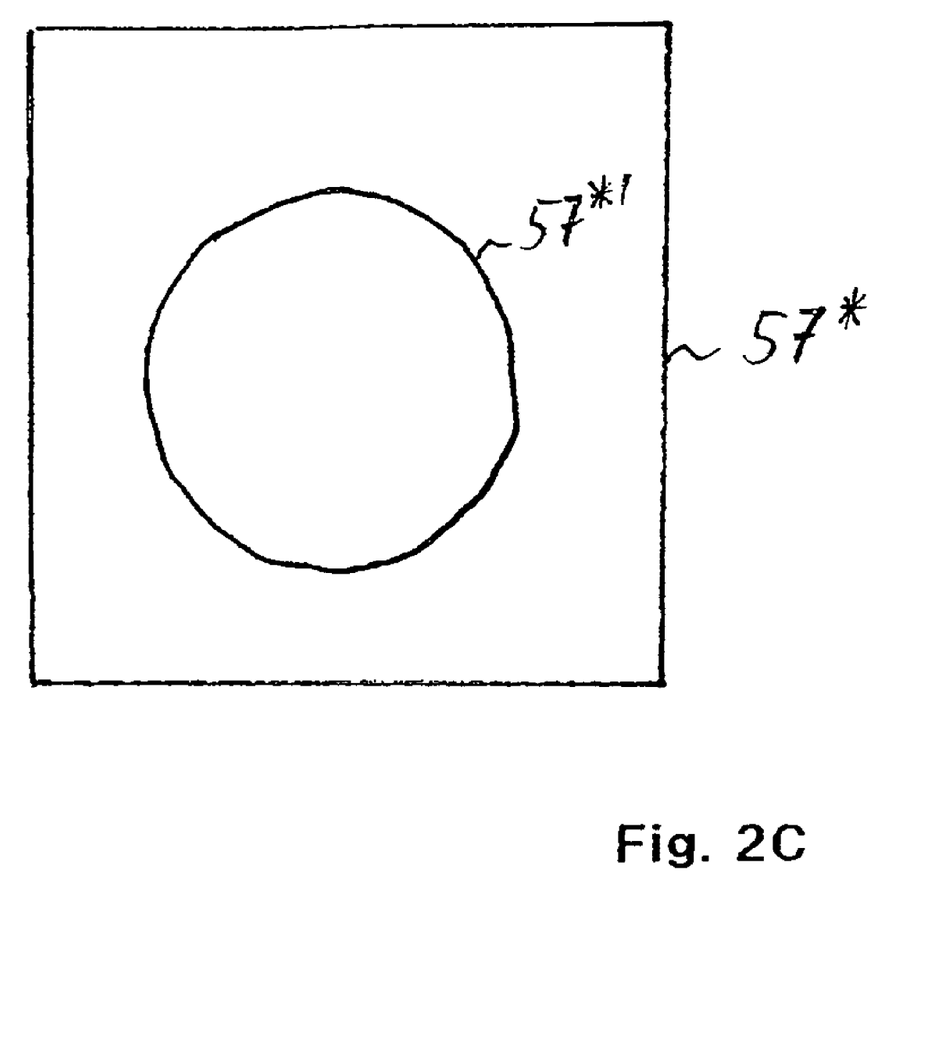

An infrared filter carrier 57* which is schematically shown in FIG. 2C can be used as an alternative to the above-described infrared filter carrier 57 that can be linearly displaced by using a drive 58, which infrared filter carrier 57* supports an LC filter **57*' that can be electrically switched by using the controller 3, which LC filter 57*' is substantially opaque for near-infrared radiation having a wavelength larger than 700 nm in a first operating state of the filter carrier 57*, and which LC filter 57*'** is substantially opaque for near-infrared radiation having a wavelength larger than 730 nm in a second operating state.

Further, as an alternative to the above described infrared filter carrier 57 which can be linearly displaced by using the drive 58, a filter carrier supporting a filter similar to the one shown in FIG. 2C may also be used, said filter carrier having a first operating state in which a filter supported by the filter carrier encloses a first angle of inclination with a core beam of a respective optical path, as well as a second operating state, in which the filter encloses a second angle of inclination with the core beam different from the first angle of inclination. In this respect, the filter has two different filter characteristics for the at least two different angles of inclination with respect to radiation guided in the respective optical path, and a drive for tilting the filter is provided. In contrast to the filter shown in FIG. 2C, the filter characteristic is thus not directly changed by electrically switching the filter, but indirectly by changing the angle at which radiation is transmitted through it. Such a filter can be realized by a volume-reflective hologram, for example.

Even if the infrared filter carrier 57 is arranged directly in front of the camera optics 55 and thus in front of the CCD camera 56 in the embodiment shown in FIG. 1, the infrared filter carrier can alternatively be arranged at an arbitrary location in the first observation optical path 33 between the between the object 22 and the semi-reflective mirror 39.

The images taken by the CCD camera 56 are transmitted as image data via a data line to an evaluation device (not shown).

According to the embodiment shown in FIG. 1 the images generated by the CCD camera 56 are further transmitted as image data via an additional data line to a calibration device 59 for correcting color aberrations. The calibration device 59 is connected to the controller 3 and has a first operating state in which it color-calibrates image data electronically to correct a color aberration (which is, for example, caused by infrared radiation) and transmits the corrected image data to the evaluation device. Further, the calibration device 59 has a second operating state in which it transmits the image data unchanged to the evaluation device. The two operating states of the calibration device are controlled by the controller, as will be described later. If a corresponding calibration device is provided, the separate infrared filter carrier optionally can be omitted.

As a further alternative, in order to correct the color aberrations caused by infrared radiation in the image data generated by the camera, the skilled person is also familiar with a cyclic operation of an illumination source causing the infrared radiation and an anti-cyclic reading of the camera as well as the use of a 3-chip camera with a color separator which completely guides infrared radiation to a red channel of the camera to avoid a color aberration caused by the infrared radiation. Furthermore, the skilled person knows cameras having an RR'GB-Bayer filter, wherein the R part of the RR'GB-Bayer filter, for example, only transmits radiation having a wavelength below 700 nm and the R' part of the RR'GB-Bayer filter, for example, only transmits radiation having a wavelength of between 700 nm and 730 nm or, for example, only radiation having a wavelength up to 730 nm. Such RR'GB-Bayer filter allows a separate reading of an infrared portion contained in incident radiation.

When applying the above-cited alternative concepts for correcting color aberration especially caused by infrared radiation in image data generated by a camera, it is optionally possible to omit the provision of the above-described separate infrared barrier filter 57', **57*' in front of the CCD camera 56. Furthermore, the provision of the above-described infrared barrier filter 57', 57*' in front of the CCD camera 56 optionally can be omitted, if the filter 62 that has the filter characteristic 62c and is supported by the first observation filter carrier 60 is arranged in the first observation optical path 33**.

A further semi-reflective filter 38 couples a further beam out of the second observation optical path 32, said beam being guided to a light-sensitive surface 54' of an infrared camera 54 via a camera adapter optics 53 such that the surface 54' can generate infrared images of the object 22 when being observed at an angle $\alpha$ with respect to the optical axis 21. To this end, an infrared filter 52 is arranged in the beam between the semi-reflective mirror 38 and the camera optics 53. The infrared filter 52 is a reflective filter which is substantially transparent for near-infrared radiation having a wavelength larger than 800 nm with the filter characteristic 52c schematically shown in FIG. 3C by a dotted line. The filter characteristic 52c has a threshold at approx. 800 nm, above which the filter 52 is substantially transparent and below which the filter 52 is substantially opaque. The infrared images generated by the infrared camera 54 are transmitted as image data via a data line to the evaluation device.

As an alternative to the filter 52 having the filter characteristic 52c shown in FIG. 3C, which is capable of cooperating with the filter 62' having the filter characteristic 62c' in corresponding operating states of the respective filter carriers, the filter 52 can also be configured as a bandpass having a transmission range from approx. 800 nm to 900 nm. The filter 62' can then be omitted.

The images generated by the cameras 54 and 56 are transmitted by the evaluation device as image data to a monitor 5 via a line that is not shown. To this end, the evaluation device first transforms the image data generated by the infrared camera 54 into the visible range.

The microscope system 1 shown in FIG. 1 further comprises an illumination system 70 comprising a xenon lamp 71, an illumination optics 72, 73 and an illumination filter carrier 76. Instead of the xenon lamp 71 any other type of lamp, for example, a halogen lamp can also be used.

In the illustration of FIG. 1 the illumination optics 72, 73 is arranged relatively close to the objective 20. However, a main axis of an illumination optical path 75 provided by the illumination optics 72, 73 extends toward the object 22 at a relative large angle with respect to the optical axis 21 of the objective 20 in this illustration. Such a relatively large angle between the main axis of the illumination optical path 75 and the optical axis 21 of the objective can result in that during an observation of, for example, a tissue (corresponds to the object 22) at a bottom of a deep hole in the tissue this bottom is not sufficiently illuminated and thus the area of interest of the object 22 cannot be observed satisfactorily. For such applications it is then preferred to arrange the illumination system 70 such that the main axis of the illumination optical path 75 is directed to the object at a smaller angle with respect to the optical axis 21 (for example, in that the light beam passes through lenses of the objective or lenses in the objective are provided with holes through which the illumination light beam passes).

The illumination filter carrier 76 of the illumination system 70 is arranged in the illumination optical path 75. In the embodiment shown, the illumination filter carrier 76 is a pivot-mounted circular disk and supports a first illumination filter that is transparent for the excitation band A1 of the fluorescent dye Protoporphyrin IX and, at the same time, substantially opaque for the excitation band of the fluorescent dye ICG. The corresponding filter characteristic 77c is shown in dotted lines in FIG. 3A.

In the present context, a filter which is substantially transparent for a band is understood as being a filter that transmits radiation in a first wavelength range that includes at least 50% and preferably at least 70% and further preferably at least 90% of the width of the band by at least 50% and preferably by more than 70% and further preferably by more than 90% (with respect to the intensity of the radiation). Correspondingly, a filter that is substantially/partly opaque for a band is understood to the effect that the filter transmits radiation in a wavelength range which comprises at most 40%, preferably at most 20% and further preferably at most 10% of the width of the band by more than 50% (with respect to the intensity of the radiation).

The illumination filter carrier 76 further supports a second illumination filter 78 having the filter characteristic 78c shown in dotted line in FIG. 3B. Thus, the second illumination filter 78 is transparent for radiation between 400 nm and 780 nm and thus for radiation of the excitation bands A1, A2 (and in general for white light), and has a transmission rate of below 5% for radiation having a wavelength larger than 780 nm.

The illumination filter carrier 76 further supports an infrared barrier filter 74 which is opaque for infrared radiation above 700 nm and is used to prevent excessive heating of the object 22 when illuminated with white light by the xenon lamp 71. According to an alternative embodiment which is not separately shown, the infrared barrier filter 74 may also be arranged separate from the illumination filter carrier 76 in the illumination optical path 75 and may selectively have plural operating states controlled by the controller 3 (similar to the infrared filter carrier 57). The filter characteristic of the infrared barrier filter 74 is comparable to the filter characteristic 57c shown in FIG. 3C, but can also differ from the same.

It is evident that the illumination filter carrier 76 can also support more or less than three illumination filters. Alternatively, the illumination filter carrier 76 may in addition comprise an opening for transmitting unfiltered illumination radiation.

By use of a drive 79 connected to the controller 3, the illumination filter carrier 76 is switchable between a first operating state in which the first illumination filter 77 supported by the illumination filter carrier 76 is arranged in the illumination optical path 75, a second operating state in which the second illumination filter 78 of the illumination filter carrier 76 is arranged in the illumination optical path 75 and a third operating state in which the infrared barrier filter 74 is arranged in the illumination optical path 75.

Consequently, in the first operating state of the illumination filter carrier 76 illumination radiation of the illumination system 70 guided to the object 22 has a spectrum which includes the excitation band A1 of the fluorescent dye Protoporphyrin IX and, at the same time, is partly free from the excitation band A2 of the fluorescent dye ICG. Further, in the second operating state of the illumination filter carrier, 76 illumination radiation of the illumination system 70 guided to the object 22 has a spectrum which includes the second excitation band A2 of the fluorescent dye ICG which in the present embodiment corresponds to white light open up to 780 nm. In the third operating state, illumination is performed under white light up to 700 nm, near-infrared radiation being filtered out to avoid excessive heating of the observed object 22.

The xenon lamp 71 is further connected to the controller 3 and has a switched-on operating state and a switched-off operating state.

The filters 57', 61, 61', 62, 62', 77 used above may be selected to be transmission or reflective filters. Further, the above filters optionally can be bandpass filters (cf. filters 52, 57, 61, 62, 62') or notch filters (cf. filters 77, 78).

The microscope system 1 shown in FIG. 1 further comprises a diode 80 for illumination of the object 22 with excitation radiation 81. In the shown embodiment the excitation radiation 81 is mirrored in by a mirror 82 along the main axis 21 of the objective 20. The bandwidth of the spectrum of the excitation radiation 81 that is generated by the diode 81 substantially includes the excitation band A2 of the fluorescent dye ICG. In this respect, a spectrum which substantially includes a band is to be understood to the effect that, after standardization of both the spectrum and the band, more than 50% and preferably more than 70% and further preferably more than 90% of the area of the band are overlapped by the spectrum. The diode 80 is controlled by the controller 3 and has a first operating state, in which it emits excitation radiation, and a second operating state, in which it emits no excitation radiation.

In the shown embodiment, the controller 3 of the microscope system 1 is formed by a microprocessor that is programmatically set in a suitable way.

The controller 3 is connected to a keyboard 4 which allows a respective desired fluorescent dye to be input by a user, for example, in the form of a code. Furthermore, the controller 3 is connected to a monitor 5 to display the respective operating state of the controller 3. The monitor 5 is also used by the evaluation device for displaying image data.

The controller 3 controls the respective operating states of the filter carriers 57, 60, 60', 76, of the xenon lamp 71, the diode 80 as well as of the calibration device 59 in response to a fluorescent dye input via the keyboard 4 according to a predefined dependence. This predefined dependence is stored in tabular form in the database 6 of the controller 3 and indicates suitable operating states of the filter carriers 57, 60, 60', 76, the xenon lamp 71, the diode 80 as well as of the calibration device 59 for a plurality of fluorescent dyes. In this respect, it is possible to store for different examination methods different dependencies for the same fluorescent dye.

In the following the operation of the controller 3 will be explained with references to three examples. However, the invention is not restricted to the examples.

EXAMPLE 1

Via the keyboard the controller 3 receives a code which indicates that simultaneously an observation of the object 22 under white light and an observation of an ICG fluorescent dye shall be performed.

After receipt of such a code the controller searches in the database 6 for a suitable dependence of the operating states of the elements (in the example: filter carriers 57, 60, 60', 76, xenon lamp 71, diode 80 as well as calibration device 59) of the microscope system 1.

Due to the detected dependence the controller 3 automatically causes a switched-on operating state of the xenon lamp 71 and controls the drive 79 of the illumination system 70 such that the illumination filter carrier 76 disposes the illumination filter 78 having the filter characteristic 78c in the illumination optical path 75. As a result, the object 22 is substantially illuminated with white light, an illumination of the object with UV radiation and infrared radiation, respectively, being largely avoided.

Simultaneously, the controller 3 controls the drives 64 and 64' automatically such that the first observation filter carrier 60 disposes the observation filter 62 having the filter characteristic 62c and the second observation filter carrier 60' disposes the observation filter 62' having the filter characteristic 62c' in the respective first or second observation optical paths 33, 32. Accordingly, both observation optical paths 32, 33 and the ICD camera 56 enable an observation of the object 22 under white light. Furthermore, in the first observation optical path 33 a filtering of near-infrared radiation is performed to avoid a color aberration in the images generated by the CCD camera 56 due to infrared radiation.

Further, the second observation optical path 32 enables an observation of the fluorescence of ICG by means of the infrared camera 54.

As an alternative to arranging the observation filter 62 having the filter characteristic 62c in the first observation optical path 33, the controller is also able to control the drives 58 and 64 in dependence of the database automatically such that the infrared barrier filter 57' of the infrared filter carrier 57 and the opening 63 of the first observation filter carrier 60 are arranged in the associated optical paths.

Further alternatively, the controller 3 is able to automatically control the calibration device 59 in dependence of the database such that it color-calibrates image data generated by the CCD camera 56 to correct a possible color cast caused by the fluorescence of the ICG fluorescent dye.

EXAMPLE 2

Via the keyboard the controller 3 receives a code indicating that an observation of a Protoporphyrin IX fluorescent dye by using the xenon lamp 71 for excitation shall be performed.

After receipt of such code, the controller automatically searches in the database for a dependence of the operating states of the elements of the microscope system 1.

Due to the detected dependence the controller 3 automatically causes a switched-on operating state of the xenon lamp 71 and controls the drive 79 of the illumination system 70 automatically such that the illumination filter carrier 76 disposes the illumination filter 77 having the filter characteristic 74c in the illumination optical path 75. As a result, the object 22 is substantially illuminated only by excitation radiation for Protoporphyrin IX, whereas the spectrum of the illumination optical path is partly free from the excitation band of ICG.

Simultaneously, the controller automatically controls the drives and 64' such that the first observation filter carrier 60 disposes the observation filter 61 and the second observation filter carrier 60' disposes the observation filter 61' in the associated first and second observation optical paths 33, 32, respectively. As a result, both observation optical paths 32 and 33 allow an observation of the fluorescence. Furthermore, the overlap between the filter characteristics 77c and 61c enables at the same time a stereoscopic observation of the object 22.

Further, the controller automatically controls the drive 58 such that the opening 57" of the infrared filter carrier 57 is arranged in the associated optical path. Consequently, the CCD camera 56 is able to receive the fluorescence in the whole fluorescence band F1 of the fluorescent dye Protoporphyrin IX. Further, the controller 3 controls the calibration device 59 such that it does not color-calibrate the image data generated by the CCD camera 56 with respect to near-infrared radiation, but merely emphasizes the existing red portions contained in the generated images. A color aberration due to infrared radiation of the illumination radiation is not possible, because the spectrum of the illumination radiation is sufficiently separated from the infrared region due to the filter characteristic 77c of the illumination filter 77.

EXAMPLE 3

Via the keyboard the controller 3, receives a code which indicates that an observation of an ICG fluorescent dye shall be performed by excitation using the diode 80.

After receipt of such code, the controller automatically searches the database 6 for a suitable dependence of the operating states of the elements of the microscope system 1.

Due to the detected dependence, the controller 3 automatically causes a switched-on operating state of the xenon lamp 71 and additionally an alternating switched-on or switched-off state, respectively, of the diode 80. Further, the controller 3 automatically controls the drive 79 of the illumination system such that the illumination filter carrier 76 disposes the infrared barrier filter 74 in the illumination optical path 75. As a result, the object 22 is alternatively illuminated by either only the xenon lamp 71 with white light or by both the xenon lamp 71 with white light and simultaneously by the diode 80 with excitation radiation for ICG.

Further, the controller 3 automatically controls the drives 64 and 64' such that the first observation filter carrier 60 disposes the opening 63 and the second observation filter carrier 60' disposes the filter 62' having the filter characteristic 62c in the associated first and second observation optical paths 33, 32, respectively. Further, the controller controls the drive 58 such that the infrared filter carrier 57 disposes the infrared barrier filter 57' in the optical path in front of the CCD camera 56.

In the meantime, the controller 3 reads out the infrared camera 54 in synchronization with an activation of the diode 80 and permanently reads out the CCD camera 56. The controller 3 subtracts the images generated by the CCD camera 56 in the illumination pauses of the diode 80 from images generated by the infrared camera 54 during the illumination phases of the diode 80. As a result, a particularly sharp separation between the fluorescence image generated by the infrared camera 54 and the image of the object 22 generated by the CCD camera 56 is possible, while at the same time a visual stereoscopic observation of the object is possible.

In the shown embodiment, a change-over between the respective operating states is performed substantially synchronously by the controller 3. This means that a delay between the change-over of the operating state of a first element of the microscope system and the change-over of the operating state of a last element of the microscope system is less than 10 seconds and preferably less than 5 seconds and especially preferably less than 1 second.

As an alternative to the above described electric controller 3 using a microprocessor, the controller 3 can also be realized analogously or mechanically (for example by using gears and/or Bowden cables).

Further, alternatively a change-over need not be initiated by a keyboard 4, but can automatically be initiated in that the controller detects a change of an operating state of at least one element of the microscope system 1 (manually caused by a user) by means of suitable sensors, and the controller automatically adjusts the operating states of the remaining elements of the microscope system 1 according to the predefined dependence.

As the controller automatically switches the operating states of the elements of the illumination system and the elements of the observation system such that the operating states each are adapted to an observed fluorescent dye, the inventive microscope system is capable even under difficult hygienic conditions of sequentially observing different fluorescent dyes in an especially easy and reliable way. A faulty observation due to a deficient adjustment of the illumination system and the observation system is avoided in an especially easy and reliable way due to the provision of the controller.

It is emphasized that the present invention is not restricted to the microscope system shown in FIG. 1 or the use of described fluorescent dyes.

In summary, a microscope system is proposed for sequentially observing different fluorescent dyes that are accumulated in a tissue arranged in an object plane. For this purpose the illumination system of the microscope system for illuminating the object plane with illumination radiation has at least two different operating states, wherein in at least one of the two operating states the illumination radiation has a spectrum which includes an excitation band of a first fluorescent dye and, at the same time, is partly free from an excitation band of another fluorescent dye. Furthermore, an observation system of the microscope system for providing a first observation optical path for optically imaging the object plane has also at least two different operating states, wherein in one of the at least two different operating states the observation radiation guided in the first observation optical path has a spectrum at least in sections of the first observation optical path which includes the fluorescence band of the first fluorescent dye, and in one of the other operating states the observation radiation guided in the first observation optical path is at least in sections of the first observation path free from the fluorescence band of the first fluorescent dye. Further, the microscope system comprises a controller which is configured to selectively switch the illumination system as well as the observation system into the first operating state or to switch the illumination system as well as the observation system into the second operating state.

What is claimed is:

1. A microscope system for observation of fluorescences of different fluorescent dyes in an object placeable in an object plane
    wherein the microscope system comprises an illumination system for illuminating the object placeable in the object plane with illumination radiation and an observation system for providing a first observation optical path for optically imaging the object placeable in the object plane, wherein the observation system further comprises at least one camera, wherein the observation radiation guided in the first observation optical path can be supplied to the camera,
    wherein the illumination system has a first operating state in which the illumination radiation has a spectrum which includes a first excitation band of a first fluorescent dye and, at the same time, is partly free from a second excitation band of a second fluorescent dye different from the first fluorescent dye, and
    wherein the observation system has a first operating state in which sections of the first observation optical path guide the observation radiation having a spectrum which includes a first fluorescence band of the first fluorescent dye,
    wherein the illumination system has at least a second operating state in which the illumination radiation has a spectrum which includes the second excitation band of the second fluorescent dye,
    the observation system comprises an infrared barrier filter supported by an infrared filter carrier, wherein the observation radiation guided by the first observation optical path can be supplied to the camera via the infrared barrier filter,
    the observation system has at least a second operating state in which sections of the first observation optical path guide the observation radiation having a spectrum which is partly free from the first fluorescence band of the first fluorescent dye,
    the infrared filter carrier has a first operating state in which the first observation optical path in front of the camera is free from the infrared barrier filter, and a second operating state in which the infrared barrier filter is arranged in front of the camera in the first observation optical path, and
    the microscope system further comprises a controller, wherein the controller is configured to selectively switch the illumination system as well as the observation system and the infrared filter carrier into the first operating state or to selectively switch the illumination system as well as the observation system and the infrared filter carrier into the second operating state.

2. The microscope system according to claim 1, wherein in at least one operating state of the observation system an observation filter supported by a first observation filter carrier is arranged in the first observation optical path, which observation filter is transparent for the fluorescence band of an observed fluorescent dye and, at the same time, is substantially opaque for the fluorescence band of another fluorescent dye.

3. The microscope system according to claim 2, wherein at least one of the infrared filter carrier and the first observation filter carrier has a support element rotatable about an axis of rotation and a drive for rotating the support element, and wherein the infrared barrier filter and the first observation filter are supported by the infrared filter carrier and the first observation filter carrier respectively, and are arranged on the support element spaced apart from the axis of rotation.

4. The microscope system according to claim 2, wherein at least one of the infrared filter carrier and the first observation filter carrier has a support element which is linearly movable, and a drive for moving the support element, and wherein the infrared barrier filter and the first observation filter are respectively arranged on the support element.

5. The microscope system according to claim 2, wherein the observation system has a second observation optical path for optically imaging the object placeable in the object plane.

6. The microscope system according to claim 5, wherein the observation system comprises at least one second camera and a filter arranged in front of the second camera, wherein observation radiation guided by the second observation optical path can be supplied to the second camera via the filter, and wherein the filter is an infrared filter that is substantially transparent for near-infrared radiation or a bandpass filter having a transmission range for wavelengths between 800 nm and 900 nm.

7. The microscope system according to claim 5, wherein a second observation filter carrier supporting at least one further observation filter and being switchable between at least a first operating state and a second operating state is arranged in the second observation optical path, and
wherein the controller is configured to selectively switch the illumination system- as well as the second observation filter carrier into the first operating state or to selectively switch the illumination system as well as the second observation filter carrier into the second operating state.

8. The microscope system according to claim 7, wherein in the second operating state the second observation filter carrier supports a filter that allows observation of the fluorescence of the second fluorescent dye.

9. The microscope system according to claim 8, wherein in at least one operating state of the illumination system an illumination filter supported by an illumination filter carrier is arranged in an illumination optical path provided by the illumination system, which illumination filter is transparent for the excitation band of a fluorescent dye to be observed and, at the same time, is substantially opaque for the excitation band of another fluorescent dye.

10. The microscope system according to claim 9, wherein the illumination filter carrier supports at least two illumination filters having different filter characteristics, and
wherein at least one of the first and second observation filter carrier supports at least two observation filters having different filter characteristics.

11. The microscope system according to claim 9, wherein at least one of the illumination filter and the first observation filter and the second observation filter and the infrared barrier filter is a transmission filter or a reflective filter.

12. The microscope system according to claim 1, wherein at least one filter carrier can be switched from a first operating state in which a first filter supported by the filter carrier is arranged in the respective optical path into at least one second operating state in which the first filter supported by the filter carrier is arranged outside the respective optical path.

13. The microscope system according to claim 1, wherein at least one filter carrier supports a filter, which filter has a first filter characteristic in a first operating state of the filter carrier, and which filter has a second filter characteristic, different from the first filter characteristic, in a second operating state of the filter carrier.

14. The microscope system according to claim 1, wherein the microscope system further comprises an excitation radiation source for illuminating the object placeable in the object plane with excitation radiation, wherein the bandwidth of a spectrum of the excitation radiation is smaller than 200 nm and substantially comprises the excitation band of a fluorescent dye to be observed, and
wherein the excitation radiation source has a first operating state in which excitation radiation is emitted, and a second operating state in which no excitation radiation is emitted, and
wherein the controller is configured to selectively switch the excitation radiation source as well as the observation system into the first operating state, or to switch the excitation radiation source as well as the observation system into the second operating state.

15. The microscope system according to claim 14,
wherein the microscope system further comprises a communication interface connected to the controller, which communication interface enables an input of a respectively desired fluorescent dye, and
wherein the controller controls at least one of the operating states of the infrared filter carrier and the excitation radiation source in response to a respective fluorescent dye indicated via the communication interface according to a predefined dependence.

16. The microscope system according to claim 1,
wherein the observation system further comprises a camera for generating image data which is arranged in the first or second observation optical path, and a calibration device, which calibration device receives the image data generated by the camera and has a first operating state, in which the image data are color calibrated, and a second operating state, in which the image data are maintained unchanged, and
wherein the controller is configured to selectively switch as well the illumination system as the observation system and the calibration device into the first operating state or to selectively switch as well the illumination system as the observation system and the calibration device into the second operating state.

17. The microscope system according to claim 16,
wherein the microscope system further comprises a communication interface connected to the controller, which communication interface enables an input of a respectively desired fluorescent dye, and
wherein the controller controls at least one of the operating states of the infrared filter carrier and the calibration device in response to a respective fluorescent dye indicated via the communication interface according to a predefined dependence.

18. The microscope system according to claim 1, wherein the microscope system further comprises a communication interface connected to the controller, which communication interface enables an input of a respectively desired fluorescent dye, and
wherein the controller controls at least one of the operating states of the infrared filter carriers and first observation filter carrier and second observation filter carrier and illumination filter carrier in response to a respective fluorescent dye indicated via the communication interface according to a predefined dependence.

19. The microscope system according to claim 1,
wherein the microscope system further comprises an excitation radiation source for illuminating the object placeable in the object plane with excitation radiation, wherein the bandwidth of a spectrum of the excitation radiation is smaller than 100 nm and substantially comprises the excitation band of a fluorescent dye to be observed, and wherein the excitation radiation source has a first operating state in which excitation radiation is emitted, and a second operating state in which no excitation radiation is emitted, and
wherein the controller is configured to selectively switch the excitation radiation source as well as the observation system into the first operating state, or to switch the excitation radiation source as well as the observation system into the second operating state.
wherein the controller controls at least one of the operating states of the infrared filter carrier and the excitation radiation source in response to a respective fluorescent dye indicated via the communication interface according to a predefined dependence.

20. A microscope system for observation of fluorescences of different fluorescent dyes in an object placeable in an object plane,
wherein the microscope system comprises an illumination system for illuminating the object placeable in the object plane with illumination radiation and an observation system for simultaneously providing a first observation optical path and a second observation optical path for optically imaging the object placeable in the object plane, wherein the observation system comprises at least one camera, wherein observation radiation guided by the first observation optical path can be provided to the camera,
wherein the illumination system has a first operating state in which the illumination radiation has a spectrum which includes a first excitation band of a first fluorescent dye and, at the same time, is partly free from a second excitation band of a second fluorescent dye different from the first fluorescent dye, and
wherein the observation system has a first operating state in which an observation filter supported by a first observation filter carrier is arranged in the first observation optical path, which observation filter is transparent for the first fluorescence band of the first fluorescent dye,
wherein the illumination system has at least one second operating state, in which the illumination radiation has a spectrum, which includes the second excitation band of the second fluorescent dye,
the observation system has at least one second operating state, in which an infrared barrier filter supported by the first observation filter carrier is arranged in the first observation optical path, and
the microscope system further comprises a controller which is configured to selectively switch the illumination system as well as the observation system into the first operating state or to selectively switch the illumination system as well as the observation system into the second operating state.

21. The microscope system according to claim 20, wherein a second infrared barrier filter supported by an infrared filter carrier is arranged in at least one of the first and second observation optical path, which infrared filter carrier has a first operating state in which the first observation optical path is free from the infrared barrier filter, and has a second operating state in which the second infrared barrier filter is arranged in the first observation optical path, and wherein the controller is configured to selectively switch the illumination system as well as the observation system and the infrared filter carrier into the first operating state, or to selectively switch the illumination system as well as the observation system and the infrared filter carrier into the second operating state.

22. The microscope system according to claim 20, wherein in the first operating state of the observation system the observation filter arranged in the first observation optical path is, at the same time, substantially opaque for the fluorescence band of the second fluorescent dye.

23. The microscope system according to claim 20, wherein a second observation filter carrier supporting at least one further observation filter and being switchable between at least a first and a second operating state is arranged in the second observation optical path, and
wherein the controller is configured to selectively switch the illumination system as well as the second observation filter carrier into the first operating state or to selectively switch the illumination system as well as the second observation filter carrier into the second operating state.

24. The microscope system according to claim 20, wherein in the second operating state the second observation filter carrier supports a filter that allows observation of the fluorescence of the second fluorescent dye.

25. The microscope system according to claim 20, wherein in at least one operating state of the illumination system an illumination filter supported by an illumination filter carrier is arranged in an illumination optical path provided by the illumination system, which illumination filter is transparent for the excitation band of a fluorescent dye to be observed and, at the same time, is substantially opaque for the excitation band of another fluorescent dye.

26. The microscope system according to claim 25, wherein the illumination filter carrier supports at least two illumination filters having different filter characteristics, and
wherein the first observation filter carrier supports at least two observation filters having different filter characteristics.

27. The microscope system according to claim 25,
wherein the microscope system further comprises a communication interface connected to the controller, which communication interface enables an input of a respectively desired fluorescent dye, and
wherein the controller controls at least one of the operating states of the first observation filter carriers and illumination filter carrier in response to a respective fluorescent dye indicated via the communication interface according to a predefined dependence.

28. The microscope system according to claim 20, wherein at least one of the observation filter and the infrared barrier filter is a transmission filter or a reflective filter.

29. The microscope system according to claim 20, wherein at least one filter carrier can be switched from a first operating state in which a first filter supported by the filter carrier is arranged in the respective optical path into at least one second operating state in which the first filter supported by the filter carrier is arranged outside the respective optical path.

30. The microscope system according to claim 20, wherein the first observation filter carrier has a support element rotatable about an axis of rotation and a drive for rotating the support element, and wherein the infrared barrier filter and observation filter supported by the first observation filter carrier are arranged on the support element spaced apart from the axis of rotation.

31. The microscope system according to claim 20, wherein the first observation filter carrier has a support element which is linearly movable, and a drive for moving the support element, and wherein the infrared barrier filter and observation filter are arranged on the support element.

32. The microscope system according to claim 20, wherein at least one filter carrier supports a filter, which filter has a first filter characteristic in a first operating state of the filter carrier, and which filter has a second filter characteristic, different from the first filter characteristic, in a second operating state of the filter carrier.

33. The microscope system according to claim 20, wherein the microscope system further comprises an excitation radiation source for illuminating the object placeable in the object plane with excitation radiation, wherein the bandwidth of a spectrum of the excitation radiation is smaller than 200 nm and substantially comprises the excitation band of a fluorescent dye to be observed, and wherein the excitation radiation source has a first operating state in which excitation radiation is emitted, and a second operating state in which no excitation radiation is emitted, and wherein the controller is configured to selectively switch the excitation radiation source as well as the observation system into the first operating state, or to switch the excitation radiation source as well as the observation system into the second operating state.

34. The microscope system according to claim 33, wherein the microscope system further comprises a communication interface connected to the controller, which communication interface enables an input of a respectively desired fluorescent dye, and wherein the controller controls at least one of the operating states of the first observation filter carrier and the excitation radiation source in response to a respective fluorescent dye indicated via the communication interface according to a predefined dependence.

35. The microscope system according to claim 20, wherein the observation system further comprises a first camera for generating image data which is arranged in the first or second observation optical path, and a calibration device, which calibration device receives the image data generated by the camera and has a first operating state, in which the image data are color calibrated, and a second operating state, in which the image data are maintained unchanged, and wherein the controller is configured to selectively switch as well the illumination system as the observation system and the calibration device into the first operating state or to selectively switch as well the illumination system as the observation system and the calibration device into the second operating state.

36. The microscope system according to claim 35, wherein the microscope system further comprises a communication interface connected to the controller, which communication interface enables an input of a respectively desired fluorescent dye, and wherein the controller controls at least one of the operating states of the first observation filter carrier and the calibration device in response to a respective fluorescent dye indicated via the communication interface according to a predefined dependence.

37. The microscope system according to claim 20, wherein the observation system comprises at least one second camera and a filter arranged in front of the second camera, wherein observation radiation guided by the second observation optical path can be supplied to the second camera via the filter, and wherein the filter is an infrared filter that is substantially transparent for near-infrared radiation or a bandpass filter having a transmission range for wavelengths between 800 nm and 900 nm.

38. The microscope system according to claim 20, wherein the microscope system further comprises an excitation radiation source for illuminating the object placeable in the object plane with excitation radiation, wherein the bandwidth of a spectrum of the excitation radiation is smaller than 100 nm and substantially comprises the excitation band of a fluorescent dye to be observed, and wherein the excitation radiation source has a first operating state in which excitation radiation is emitted, and a second operating state in which no excitation radiation is emitted, and wherein the controller is configured to selectively switch the excitation radiation source as well as the observation system into the first operating state, or to switch the excitation radiation source as well as the observation system into the second operating state.

* * * * *

UNITED STATES PATENT AND TRADEMARK OFFICE
CERTIFICATE OF CORRECTION

| | | |
|---|---|---|
| PATENT NO. | : 8,040,599 B2 | Page 1 of 1 |
| APPLICATION NO. | : 12/162601 | |
| DATED | : October 18, 2011 | |
| INVENTOR(S) | : Steffen et al. | |

It is certified that error appears in the above-identified patent and that said Letters Patent is hereby corrected as shown below:

At column 3, line 17-18, please delete "flourorescent" and insert --fluorescent--.

At column 7, line 18, please delete "BRIEF DESCRIPTION OF THE DRAWINGS" and insert the same on col. 7, line 13, below "...for example." and prior to "In the following...," as a Section Heading.

At column 7, line 23, please delete "FIG. 2A 2B" and insert therefore --FIGS. 2A, 2B--.

At column 7, line 26, please delete "FIG. 3A 3B" and insert therefore --FIGS. 3A, 3B--.

At column 10, line 6, before "object" please delete "between the".

At column 10, line 6, after "mirror 39." please insert --For example, the switchable filter carrier which can be switched between at least two operating states can be integrated in the semi-reflective mirror 39 or the CCD camera 56 or the first observation filter carrier 60.--.

At column 11, line 42, before "that" please insert --77--.

At column 13, line 19, after "following" please insert --,--.

At column 14, line 22, before "and" please insert --64--.

At column 14, line 58, before "such" please insert --70--.

At column 17, line 33, in Claim 7, change "system-" to --system--.

At column 18, line 63, in Claim 18, please delete "carriers" and insert --carrier--.

At column 19, line 16, in Claim 19, please delete "state." and insert --state,--.

Signed and Sealed this
Fifth Day of June, 2012

David J. Kappos
*Director of the United States Patent and Trademark Office*